US011548229B2

(12) United States Patent
McMurtry et al.

(10) Patent No.: US 11,548,229 B2
(45) Date of Patent: Jan. 10, 2023

(54) ADDITIVE MANUFACTURING METHOD AND SYSTEM

(71) Applicant: RENISHAW PLC, Wotton-under-Edge (GB)

(72) Inventors: David R McMurtry, Stancombe (GB); Geoffrey McFarland, Wickwar (GB); Ramkumar Revanur, Stafford (GB)

(73) Assignee: RENISHAW PLC, Wotton-under-Edge (GB)

( * ) Notice: Subject to any disclaimer, the term of this patent is extended or adjusted under 35 U.S.C. 154(b) by 775 days.

(21) Appl. No.: 16/075,301

(22) PCT Filed: Mar. 2, 2017

(86) PCT No.: PCT/GB2017/050555
§ 371 (c)(1),
(2) Date: Aug. 3, 2018

(87) PCT Pub. No.: WO2017/149308
PCT Pub. Date: Sep. 8, 2017

(65) Prior Publication Data
US 2019/0030823 A1 Jan. 31, 2019

(30) Foreign Application Priority Data
Mar. 4, 2016 (IN) .............................. 201611007695

(51) Int. Cl.
*B29C 64/393* (2017.01)
*G06T 19/20* (2011.01)
(Continued)

(52) U.S. Cl.
CPC .......... *B29C 64/393* (2017.08); *B29C 64/153* (2017.08); *G06T 19/20* (2013.01);
(Continued)

(58) Field of Classification Search
USPC ........................................................ 700/118
See application file for complete search history.

(56) References Cited

U.S. PATENT DOCUMENTS 6,129,872 A * 10/2000 Jang ...................... B29C 64/40
264/75
10,112,260 B2 * 10/2018 Crear ................... B23K 26/127
(Continued)

FOREIGN PATENT DOCUMENTS

| CN | 103752823 A | 4/2014 |
| CN | 104050314 A | 9/2014 |

(Continued)

OTHER PUBLICATIONS

Tong et al., "Software compensation of rapid prototyping machines" Precision Engineering, issue 28, 2004, pp. 280-292 (Year: 2004).*
(Continued)

*Primary Examiner* — Emilio J Saavedra
(74) *Attorney, Agent, or Firm* — Oliff PLC

(57) ABSTRACT

A method builds a workpiece using an additive manufacturing process, wherein the workpiece is built up by consolidating material in a layer-by-layer manner. The method includes receiving an initial geometric model defining surface geometry of the workpiece, determining workpiece slices to be consolidated as layers of the workpiece during the additive manufacturing process from the initial geometric model, determining adjusted positions of the workpiece slices adjusted from initial positions of the workpiece slices as determined from the initial geometric model, the determination of the adjusted positions based upon warping of the workpiece expected to occur during or after the additive manufacturing process, and building the workpiece using the additive manufacturing process, wherein the workpiece slices are formed in the adjusted positions.

13 Claims, 5 Drawing Sheets

(51) Int. Cl.
*B29C 64/153* (2017.01)
*B33Y 50/00* (2015.01)
*B33Y 10/00* (2015.01)
*B33Y 30/00* (2015.01)
*B33Y 50/02* (2015.01)

(52) U.S. Cl.
CPC ............... *B33Y 10/00* (2014.12); *B33Y 30/00* (2014.12); *B33Y 50/00* (2014.12); *B33Y 50/02* (2014.12); *G06T 2219/008* (2013.01); *G06T 2219/2021* (2013.01)

(56) References Cited

U.S. PATENT DOCUMENTS

| | | | |
|---|---|---|---|
| 2002/0029814 A1 | 3/2002 | Unger et al. | |
| 2010/0125356 A1* | 5/2010 | Shkolnik | G06T 5/006 700/98 |
| 2014/0277669 A1 | 9/2014 | Nardi et al. | |
| 2015/0004046 A1 | 1/2015 | Graham et al. | |
| 2015/0266235 A1 | 9/2015 | Page | |
| 2015/0367415 A1 | 12/2015 | Buller et al. | |
| 2016/0082666 A1* | 3/2016 | de Pena | G05B 19/4099 700/98 |
| 2016/0224017 A1* | 8/2016 | Huang | G01N 21/9515 |
| 2017/0165921 A1* | 6/2017 | Fetter | B29C 64/386 |

FOREIGN PATENT DOCUMENTS

| | | |
|---|---|---|
| CN | 105308654 A | 2/2016 |
| WO | 2011/107729 A1 | 9/2011 |
| WO | 2011/107746 A1 | 9/2011 |
| WO | 2015/106836 A1 | 7/2015 |

OTHER PUBLICATIONS

May 12, 2017 International Search Report issued in International Patent Application No. PCT/GB2017/050555.

May 12, 2017 Written Opinion issued in International Patent Application No. PCT/GB2017/050555.

Held et al.; "Correcting warpage of laser-sintered parts by means of a surface-based inverse deformation algorithm;" Engineering with Computers; vol. 25; pp. 389-395; Jul. 25, 2009.

* cited by examiner

ADDITIVE MANUFACTURING METHOD AND SYSTEM

FIELD OF INVENTION

This invention concerns an additive manufacturing method and system and, in particular, a method and system for compensating for thermal stresses that occur during an additive manufacturing build.

BACKGROUND

Additive manufacturing or rapid prototyping methods for producing parts comprise layer-by-layer solidification of a flowable material. There are various additive manufacturing methods, including powder bed systems, such as selective laser melting (SLM), selective laser sintering (SLS), electron beam melting (EBM) and stereolithography, and non-powder bed systems, such as fused deposition modelling, including wire arc additive manufacturing.

In selective laser melting, a powder layer is deposited on a powder bed in a build chamber and a laser beam is scanned across portions of the powder layer that correspond to a cross-section (slice) of the workpiece being constructed. The laser beam melts or sinters the powder to form a solidified layer. After selective solidification of a layer, the powder bed is lowered by a thickness of the newly solidified layer and a further layer of powder is spread over the surface and solidified, as required.

A workpiece can distort, during or after the additive build, due to resulting thermal stresses. These can be mitigated by the use of supports during the build and post-treatment of the workpiece to relieve thermal stresses. However, removal of the supports after the build and post-treatment to relieve thermal stresses can increase the complexity and cost of the manufacturing process. It is desirable to reduce the need for post-processing of the workpiece.

SUMMARY OF INVENTION

According to a first aspect of the invention there is provided a method of building a workpiece using an additive manufacturing process, wherein the workpiece is built up by consolidating material in a layer-by-layer manner, the method comprising receiving an initial geometric model defining surface geometry of the workpiece, determining workpiece slices to be consolidated as layers of the workpiece during the additive manufacturing process from the initial geometric model, determining adjusted positions of the workpiece slices adjusted from initial positions of the workpiece slices as determined from the initial geometric model, the determination of the adjusted positions based upon warping of the workpiece expected to occur during or after the additive manufacturing process, and building the workpiece using the additive manufacturing process, wherein the workpiece slices are formed in the adjusted positions.

The positions of the workpiece slices may be adjusted such that warping of the workpiece during or after the build returns the workpiece to or towards the desired surface geometry as defined in the initial geometric model. In particular, the adjusted positions may be positions determined by shifting the positions of the workpiece slices as determined from the initial geometric model in a direction counter to a direction of movement during the expected warping of the workpiece.

Such a method may reduce the need for stress relieving the part after the additive manufacturing process and/or the number of supports required for the build.

The method may comprise a determination of a warping of the workpiece expected to occur during or after the additive manufacturing process. The determination may comprise determining a degree of warping of a test workpiece built using the additive manufacturing process in accordance with the initial geometric model. For example, the test workpiece may be built using the initial positions of the workpiece slices.

The degree of warping may be determined by measuring the test workpiece after warping has occurred, such as after a slice has been built but during the build or a predetermined time after the end of the build. The test workpiece may be measured when still attached to a build plate, after being released from a build plate and/or before or after heat treatment.

The measurement of the test workpiece may be carried out using a contact or non-contact measurement probe. For example the measurement probe may be a touch trigger or scanning contact probe or an optical non-contact probe. The test workpiece may be measured on a coordinate positioning machine, such as a coordinate measuring machine or a machine tool on which a measurement probe is mounted. The coordinate positioning machine may be a non-Cartesian coordinate positioning machine, for example as described in WO2011/107729 and WO2011/107746. The coordinate positioning machine may be a measurement gauge, such as the Equator™ measurement gauge as sold by Renishaw plc.

The method may comprise determining positions of test workpiece slices built during the additive manufacturing process after distortion of the test workpiece and determining the adjusted positions of the workpiece slices from comparing the positions of the test workpiece slices to the initial positions of the workpiece slices.

Determining positions of the test workpiece slices may comprise generating, from the measurements of the test workpiece, a measured geometric model defining surface geometry of the test workpiece and slicing the measured geometric model to determine the positions of the test workpiece slices. The adjusted positions may be an adjustment of the positions of the workpiece slices in a direction opposite to a direction of displacement of the test workpiece slices from the initial positions of the workpiece slices.

Alternatively, the method may comprise for each test workpiece slice of a plurality of the test workpiece slices, measuring a plurality of points on a surface of the test workpiece in a plane corresponding to the test workpiece slice and determining a position of the test workpiece slice from the plurality of points measured in the plane.

A magnitude of the adjustment of the positions of the workpiece slices may be based upon a magnitude of the displacement of the test workpiece slices from the initial positions of the workpiece slices.

The workpiece may be built in the same orientation in a build volume and, preferably, with the same supports as the test workpiece. The workpiece may be built in the same position within a build volume as the test workpiece. The workpiece may be built in an identical build as the test workpiece, i.e. if the test workpiece is built together with further workpieces then the workpiece is also built with nominally identical further workpieces in the same positions within a build volume.

The positions of the slices are the positions relative to other ones of the slices of the workpiece.

In a further embodiment, the adjusted positions may take into account a difference in the build of the workpiece and the build of the test workpiece. The method may comprise determining the adjusted positions from a mapping describing how the adjusted positions should be modified based upon the difference between the builds. The difference may comprise a difference in a position in a build volume in which the workpiece is built compared to the test workpiece. In particular, a rate of cooling of the workpiece may vary depending on a position of the workpiece in the build volume. A rate at which a workpiece cools may affect the warping that occurs. The difference may comprise a different additive manufacturing apparatus, different atmospheric condition(s), such as temperature, and/or a difference in processing speeds.

The method may comprise building a series of test workpieces each based upon the adjusted positions for the workpiece slices determined from the distortion that occurred for the previous test workpiece until surface geometry of a test workpiece of the series matches that of the initial geometric model within a predefined tolerance.

The method may comprise determining the warping of the workpiece expected to occur during or after the additive manufacturing process from a thermal model of the build/workpiece.

According to a second aspect of the invention there is provided a system comprising a processor, the processor arranged to determine workpiece slices to be consolidated as layers of the workpiece during an additive manufacturing process from an initial geometric model defining surface geometry of a workpiece, determine adjusted positions of the workpiece slices adjusted from initial positions of the workpiece slices as determined from the initial geometric model, the determination of the adjusted positions based upon warping of the workpiece expected to occur during or after the additive manufacturing process, and generate a build file for instructing an additive manufacturing apparatus to build the workpiece using the additive manufacturing process, wherein the workpiece slices are formed in the adjusted positions.

According to a third aspect of the invention there is provided a data carrier having instructions stored thereon, which, when executed by a processor, causes the processor to determine workpiece slices to be consolidated as layers of the workpiece during an additive manufacturing process from an initial geometric model defining surface geometry of a workpiece, determine adjusted positions of the workpiece slices adjusted from initial positions of the workpiece slices as determined from the initial geometric model, the determination of the adjusted positions based upon warping of the workpiece expected to occur during or after the additive manufacturing process, and generate a build file for instructing an additive manufacturing apparatus to build the workpiece using the additive manufacturing process, wherein the workpiece slices are formed in the adjusted positions.

The data carrier may be a suitable medium for providing a machine with instructions such as non-transient data carrier, for example a floppy disk, a CD ROM, a DVD ROM/RAM (including −R/−RW and +R/+RW), an HD DVD, a Blu Ray™ disc, a memory (such as a Memory Stick™, an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

According to a fourth aspect of the invention there is provided a method of determining a location of layers of a workpiece built using an additive manufacturing process, wherein the workpiece is built up by consolidating material in a layer-by-layer manner, comprising, for each layer of a plurality of the layers built using the additive manufacturing process, measuring a plurality of points on a surface of the workpiece in a plane corresponding to the layer and determining from the measurements relative locations of the plurality of layers.

Such a method may be used in the method of the first aspect of the invention or in other methods, such as in the validation of a workpiece built using the additive manufacturing process.

The location of each plane may be determined from a known layer thickness of the additive manufacturing process. The location of each plane may be determined from the known layer thickness and a datum on or connected with the workpiece. For example, the datum may be a surface, such as an upper surface, of a build plate on which the workpiece is built.

The plurality of layers may be determined from a selection of layers made by a user when interacting with a computer-generated representation of a geometric model of the workpiece. The plurality of layers may be selected by the user identifying a line or patch on a surface of the workpiece in the computer-generated representation, the plurality of layers being the layers that intersect the line or patch.

According to a fifth aspect of the invention there is provided a system comprising a processor, the processor arranged to determine workpiece slices to be consolidated as layers of the workpiece during an additive manufacturing process from a geometric model defining surface geometry of a workpiece, determine a location of the layers relative to a datum, generate instructions for a coordinate measuring apparatus to measure, for each layer of a plurality of the layers, a plurality of points on a surface of the workpiece in a plane corresponding to the layer.

The processor may be arranged to receive from a user a selection of the plurality of layers. The selection may be a selection of a line or patch of a surface defined in the geometric data.

According to a sixth aspect of the invention there is provided a data carrier having instructions stored thereon, which, when executed by a processor, causes the processor to determine workpiece slices to be consolidated as layers of the workpiece during an additive manufacturing process from a geometric model defining surface geometry of a workpiece, determine a location of the layers relative to a datum, generate instructions for a coordinate measuring apparatus to measure, for each layer of a plurality of the layers, a plurality of points on a surface of the workpiece in a plane corresponding to the layer.

DESCRIPTION OF EMBODIMENTS

Figure 1:
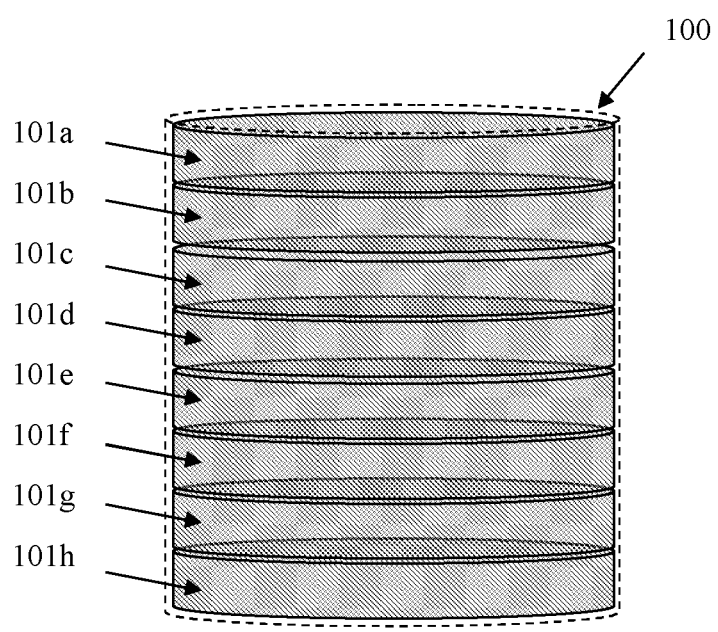
FIG. 1 shows an initial geometric model of a workpiece and workpiece slices to be built as layers of the workpiece in an additive manufacturing process.

Referring to FIGS. 1 to 4, to build a workpiece using an additive manufacturing apparatus 500, a set of instructions are generated from an initial geometric model, such as a model in an STL format, defining intended surface geometry 100 for the workpiece. The initial geometric model itself may be derived from another model, such as a CAD model. The initial geometric model is provided to computer system 502, such as a standard desktop computer, which determines (step A) slices 101a to 101h from the surface geometry 100 corresponding to layers of the workpiece to be built in the additive manufacturing apparatus 500 and initial positions of the slices 101a to 101h relative to each other. The computer system 502 also determines scan paths (not shown) for an energy beam, such as a laser beam, to take to consolidate material to form the slices 101a to 101h. The slices and scan paths may be determined using known algorithms.

A first, test workpiece 200 is built (step B) with the additive manufacturing apparatus 500 using the determined scan paths and based upon the initial positions determined in step A. During or after the build, the test workpiece 200 my warp due to thermal stresses that occur during or after the build. For example, the test workpiece 200 may curl upwards during the build or distort after the build, for example when the test workpiece 200 is released from supports used during the build to hold the test workpiece 200 in place upon a build plate 405.

The method comprises determining geometry of the test workpiece 200 after the workpiece 200 has undergone distortion due to thermal stresses. The geometry of the test workpiece 200 may be measured before the test workpiece 200 is released from a build plate 405 to which it is attached by supports, after release from the build plate 405 and/or before or after heat treatment. The geometry may be determined by measuring the warped test workpiece 200 with measuring device 501. The measuring device 501 may comprise a surface sensing device, such as contact probe 202 or a non-contact probe. A measured geometric model 300, for example in an STL format, defining the surface geometry of the warped test workpiece 200 is generated from measurement data generated by the measuring device 501.

Figure 2:
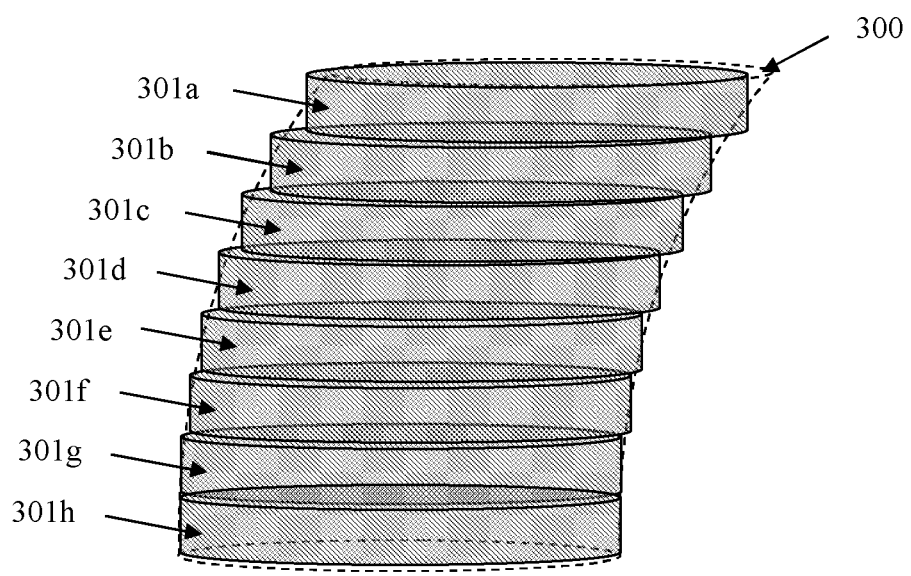
FIG. 2 shows a measured geometric model of a test workpiece determined from measurements of the test workpiece and test workpiece slices corresponding to layers of the test workpiece built in an additive manufacturing process.
Figure 3:
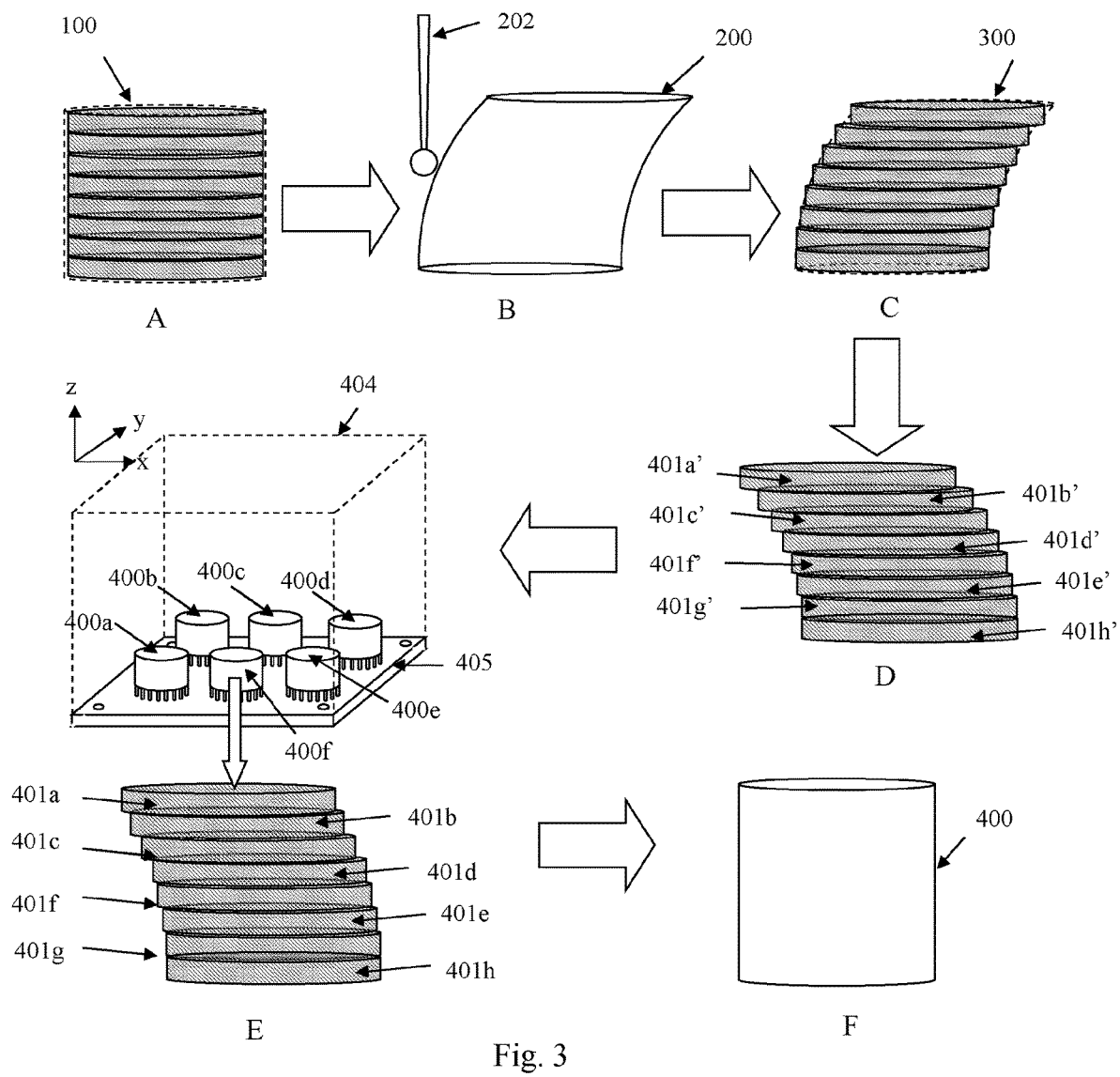
FIG. 3 is a flow diagram of a method according to an embodiment of the invention.

As shown in FIG. 2, the computer system 502 is used to determine (step C) slices 301a to 301h based upon the measured geometric model 300. Slices 301a to 301h correspond to slices 101a to 101h in that the slices 301a to 301h are of the same thickness and are calculated for the same z-heights on the workpiece. A difference in the relative positions of slices 101a to 101h and slices 301a to 301h is then determined.

An adjusted position 401a to 401h is determined for the slices by shifting (step D) the slices 401a' to 401h' in an opposite direction to the shift of slices 301a to 301h that resulted from warping of the test workpiece 200. A magnitude of the shift is based upon the difference between the positions of slices 301a to 301h compared to slices 101a to 101h (Step D). Such an adjusted position (as shown in step D) may be used for all instances 400a to 400f of the workpiece in the build volume 404. However in this embodiment, the adjusted positions 401a to 401h comprises a modification to the magnitude of the shift 401a' to 401h' shown in step D for each instance 400a to 400f of the workpiece based upon the position of the instance 400a to 400f in the build volume 404. For example, an appropriate correction table/mapping for the build volume 404 can be used to modify the adjusted position for each instance of the workpiece. The correction table/mapping can be determined empirically through the building of appropriate test pieces (which may have a different geometry to the workpiece 100).

The additive manufacturing apparatus 500 is then controlled to build the workpiece(s) 400 by consolidating material to form the slices at the adjusted positions 401a to 401h. Distortion of the workpiece(s) 400 during the or after the build may then bring the workpiece(s) 400 closer to the nominal dimensions of the workpiece as defined in the initial geometric model 100 when compared to the test workpiece 200.

Figure 4:
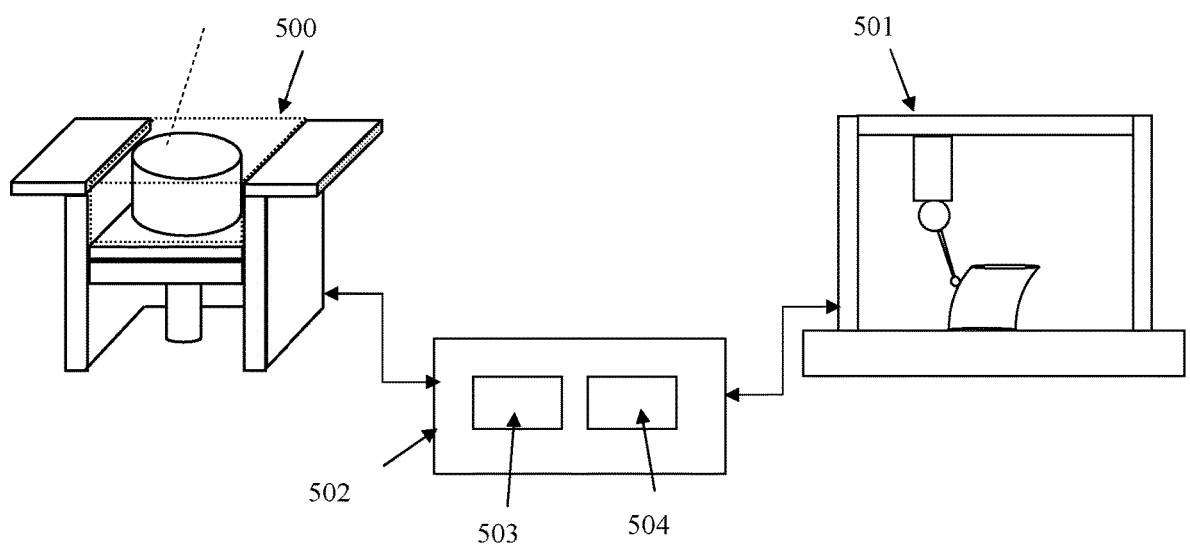
FIG. 4 shows a system according to an embodiment of the invention.

FIG. 4 shows the system for implementing the method. The system comprises the additive manufacturing apparatus 500 for building the workpieces 200, 400, the coordinate measuring apparatus 501 for measuring surface geometry of the test workpiece 200 and computer 502. The computer 502 is in communication with the additive manufacturing apparatus 500 and measuring apparatus 501 for sending instructions to the additive manufacturing apparatus 500 and measuring apparatus 501 and receiving measurement data from the measuring apparatus 501. Computer 502 comprises a processor 503 and memory 504. Memory 504 has stored therein a computer program, which, when executed by the processor 503, causes the processor 503 to generate build instructions for instructing the additive manufacturing apparatus 500 to build the test workpiece 200, generate measuring instructions for instructing the measuring apparatus 501 to measure the test workpiece 200, receive measurement data of the test workpiece 200 from the measuring apparatus 501, determine, as described above, adjusted positions 401a to 401h of the workpiece slices and generate instructions for instructing the additive manufacturing apparatus 500 to build the workpiece 400 using the adjusted positions 401a to 401h for the workpiece slices.

In an alternative embodiment, rather determining the positions of slices 301a to 301h from a measured geometric model 300 (step C), the measurement probe is programmed to directly measure locations on a surface of the test workpiece 200 that corresponds to a vertical z-height of each slice 101a to 101h such that a position of each test workpiece slice can be determined directly from the measurements. A build plate 405 on which the test workpiece is built may be used as a datum from which the z-height is determined.

Figure 5:
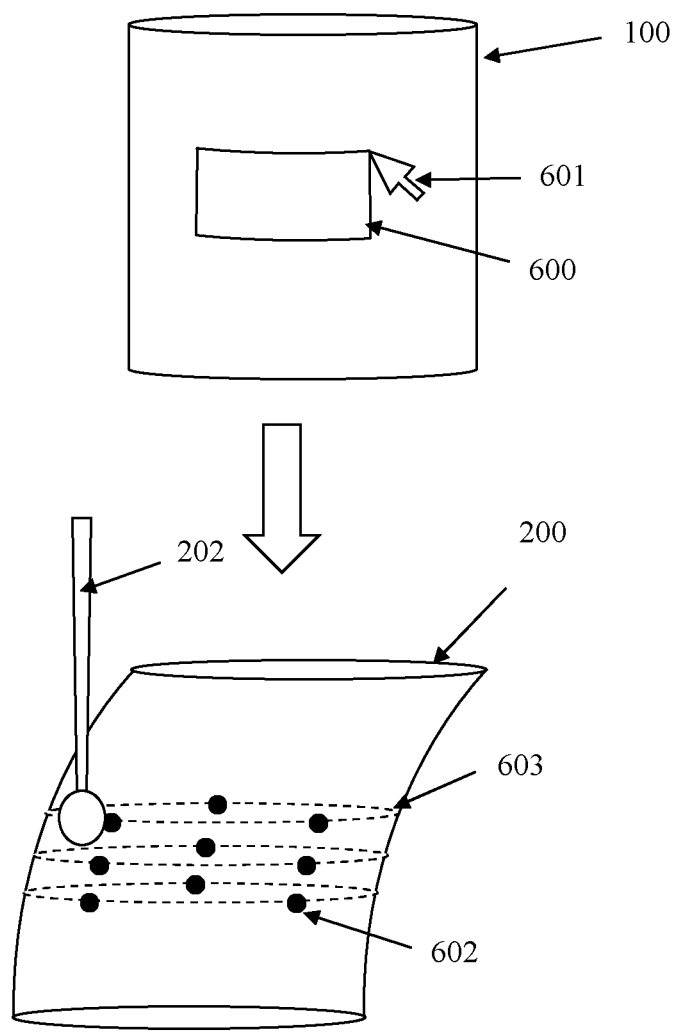
FIG. 5 shows a method of determining the locations of slices of a workpiece built using an additive manufacturing process.

Referring to FIG. 5, the user selects a patch 600 on a 3D representation of the workpiece as determined from the initial workpiece model. The patch 600 identifies a region of the workpiece 100 for which a location of the slices is to be adjusted to compensate for warping of the workpiece after the build. For example, a user could form the patch 600 on the 3D representation of the workpiece using an appropriate input device, such as pointing device 601. Computer 502 identifies workpiece slices that intersect the patch 600 and generates measurement instructions for instructing a measurement device 202 to measure points 602 on a test workpiece 200 built based upon the initial positions of the workpiece slices as determined from the initial geometric model. The instructions may include a definition of a path 603 for the measurement device 202 to take when measuring the test workpiece 200 in addition to or instead of points 602.

The instructions are then sent to a measuring apparatus 501 to cause the measuring apparatus to measure the test workpiece 200 in the manner defined by the instructions. The measuring apparatus 501 may use one or more surfaces of the build plate 405 as a reference datum to allow the measurement apparatus to find the required measurement points 602 on the workpiece 200. From these measurements a position of the test workpiece slices can be determined. These positions can then be used in the same manner as described above with reference to FIG. 3 to determine the adjusted positions. This method of determining the positions of the test workpiece slices may require the measurement of fewer points than a method that recreates a geometric model of the test workpiece.

This method of measuring workpieces may also be used in other methods, such as for the validation of a workpiece built using an additive manufacturing process. For example, the position of the slices of the workpiece may be compared to a nominal position as defined in the workpiece model and a determination made as to whether the position of the slices is within an acceptable tolerance.

Alterations and modifications can be made to the above-described embodiments without departing from the scope of the invention as defined in the claims. For example, the adjusted positions 401a to 401h may comprise other modifications to the magnitude of the shift 401a' to 401h' to take account of other factors affecting the build of the workpiece that differ from the build of the test workpiece 200. For example, a change in other workpieces, such as a different workpiece or number of workpieces, to be built in the build volume together with the workpiece for which a compensation is being made. A change in other workpieces in the build may affect the thermal stresses in the workpiece because of differences in a time between consolidations of layers of the workpiece. Furthermore, if the workpiece is to be built in a different additive manufacturing apparatus to the test workpiece, an appropriate mapping between the two apparatus may be used for determining the adjusted position from the shift 401a' to 401h'.

The invention claimed is:

1. A method of building a workpiece using an additive manufacturing process, wherein the workpiece is built up by consolidating material in a layer-by-layer manner, the method comprising:
receiving an initial geometric model defining surface geometry of the workpiece;
determining, from the initial geometric model, initial workpiece slices to be consolidated as layers of the workpiece during the additive manufacturing process;
building a test workpiece in accordance with the initial workpiece slices using the additive manufacturing process;
determining a degree of warping of the test workpiece by measuring the test workpiece after an end of the building of the test workpiece; and
determining workpiece slices having adjusted positions that are adjusted from initial positions of the workpiece slices as determined from the initial geometric model, the adjusted positions being determined such that (i) warping of the workpiece expected to occur during or after the additive manufacturing process and (ii) building of the workpiece using the additive manufacturing process and with the adjusted positions returns the workpiece to or toward the surface geometry as defined in the initial geometric model.

2. The method according to claim 1, wherein the adjusted positions are shifts from the initial positions in a direction counter to a direction of movement during the expected warping of the workpiece.

3. The method according to claim 1, comprising:
determining, from the measuring of the test workpiece, positions of slices of the test workpiece after distortion of the test workpiece; and
determining the adjusted positions of the workpiece slices from comparing positions of the test workpiece slices to the initial positions of the workpiece slices.

4. The method according to claim 3, wherein determining positions of the test workpiece slices comprises generating, from the measuring of the test workpiece, a measured geometric model defining surface geometry of the test workpiece and slicing the measured geometric model to determine positions of the test workpiece slices.

5. The method according to claim 3, comprising, for each test workpiece slice of a plurality of the test workpiece slices, measuring a plurality of points on a surface of the test workpiece in a plane corresponding to the test workpiece slice and determining a position of the test workpiece slice from the plurality of points measured in the plane.

6. The method according to claim 3, wherein the adjusted positions are an adjustment of the positions of the workpiece slices in a direction opposite to a direction of displacement of the test workpiece slices from the initial positions of the workpiece slices.

7. The method according to claim 6, wherein a magnitude of the adjustment of the positions of the workpiece slices is based upon a magnitude of the displacement of the test workpiece slices from the initial positions of the workpiece slices.

8. The method according claim 1, wherein the workpiece is built in the same orientation in a build volume as the test workpiece.

9. The method according to claim 1, wherein the workpiece is built with the same supports as the test workpiece.

10. The method according to claim 1, wherein the workpiece is built in the same position within a build volume as the test workpiece.

11. The method according to claim 1, wherein the adjusted positions take into account a difference in a build of the workpiece and a build of the test workpiece.

12. The method according to claim 11, comprising determining the adjusted positions using a mapping describing how the adjusted positions should be modified based upon the difference between the builds.

13. The method according to claim 11, wherein the difference comprises a difference in a position in a build volume in which the workpiece is built compared to the test workpiece.

* * * * *